United States Patent
Fleri et al.

(10) Patent No.: US 6,462,145 B1
(45) Date of Patent: Oct. 8, 2002

(54) POLYMER BLENDS OF TRIMETHYLENE TEREPHTHALATE AND AN ELASTOMERIC POLYESTER

(76) Inventors: Paul C. Fleri, 70 Alpine Dr., Jericho, VT (US) 05465; Samuel M. Baker, 128 Lake Ave., W. Carleton Pl., Ontario (CA), K7C 1M1

( * ) Notice: Subject to any disclaimer, the term of this patent is extended or adjusted under 35 U.S.C. 154(b) by 0 days.

(21) Appl. No.: 09/620,129

(22) Filed: Jul. 20, 2000

Related U.S. Application Data

(63) Continuation-in-part of application No. 09/357,163, filed on Jul. 19, 1999, now abandoned.

(51) Int. Cl.⁷ .............................................. C08L 67/02
(52) U.S. Cl. ....................................... 525/444; 524/539
(58) Field of Search ............................................ 525/444

(56) References Cited

U.S. PATENT DOCUMENTS

| | | | |
|---|---|---|---|
| 4,222,928 A | * | 9/1980 | Kawamura ................. 525/107 |
| 4,289,173 A | | 9/1981 | Miller |
| 4,529,013 A | | 7/1985 | Miller |
| 5,137,601 A | | 8/1992 | Hsu |
| 5,169,711 A | * | 12/1992 | Bhatt ........................ 428/257 |
| 5,871,468 A | * | 2/1999 | Kramer ...................... 604/96 |
| 6,033,777 A | * | 3/2000 | Best .......................... 428/364 |

FOREIGN PATENT DOCUMENTS

| | | |
|---|---|---|
| CA | 1251124 | 3/1989 |
| DE | 25 02 466 | 4/1980 |
| EP | 0 802 280 | 10/1997 |
| EP | 0 844 320 | 5/1998 |

OTHER PUBLICATIONS

ASTM Standard, D 4603–96, published May, 1997.

* cited by examiner

*Primary Examiner*—Patricia A. Short

(57) ABSTRACT

A polymer blend consisting essentially of 80% to 95% by weight, based on the total weight of the composition, of polytrimethylene terephthalate and from 5% to 20% of an elastomeric polyester. Fibers and extrusions produced from the polymer blend are durable under repetitive compressive stresses, exhibit mechanical properties comparable to neat polyamide-6, and provide moisture stability similar to yarns and extrusions comprised of polyamide-6/10 or polyamide-6/12. These fabrics find use as forming fabrics, and press felt fabrics for paper making machines.

6 Claims, 1 Drawing Sheet

POLYMER BLENDS OF TRIMETHYLENE TERPHTHALATE AND AN ELASTOMERIC POLYESTER

This application is a continuation-in-part of U.S. Pat. No. 09/357,163 filed Jul. 19, 1999, now abandoned.

FIELD OF THE INVENTION

The present invention relates to a polymer blend consisting essentially of from about 50% to about 95% by weight, based on the total weight of the polymer composition, of polytrimethylene terephthalate and of from about 5% to about 50% of an elastomeric polyester. The polymer blend has particular utility in the fabrication of industrial fabrics that are particularly suitable for use in rigorous environments, where the dimensional stability and mechanical properties of the fabrics are important.

BACKGROUND OF THE INVENTION

Modern industrial fabrics are commonly assembled by weaving, braiding, knitting, knotting and other known methods from polymeric monofilament or multifilament yarns. It is also known from EP 802280 to assemble such fabrics from a plurality of extruded polymeric strips or panels. The chosen polymers are most frequently polyesters, copolyesters, polyamides, polyphenylene sulfides, polyphenylene oxides, fluoropolymers or polyketones. Selection of any particular polymer for a specific application will generally be dictated by the physical and mechanical properties desired, the cost of the polymer, and the prevailing environmental conditions of the end use.

The present invention is primarily concerned with a polymer blend for use in fabricating industrial fabrics intended for environments where the dimensional stability and resistance to repetitive compressive stress of the fabrics are important. The invention is thus particularly relevant to papermaking fabrics which are used to form, drain, dewater and convey a paper web as it is created within a paper making machine.

For the purposes of this application, the term "fabric" is taken to mean an assembly of components. The term "component" is taken to mean any of the components from which a fabric can be assembled, such as yarns(including monofilament, multifilament, staple and spun forms) or extrusions. The components forming the fabric can be arranged by interlacing, entangling or engagement so as to form an integrated cohesive structure, such as nets, cloth, felts, textiles and the like, which are created by weaving, knitting, knotting, joining, felting, needling, spiral winding, bonding, or similar methods. Typical components include individual monofilaments, multifilaments, spiral coils, and profiled plastics extrusions such as strips, tiles or panels. These components are generally fabricated by an appropriate method such as melt extrusion, melt spinning, casting or slitting from an extruded film. The fabricated components are then joined to form an integrated cohesive structure.

In a papermaking machine, a paper web is created in three stages. In the forming section, a water based stock of papermaking components is discharged onto a moving continuous forming fabric. As the fabric conveys the stock through the forming section, it is drained and agitated to provide a somewhat self supporting wet paper web. Drainage of the stock is augmented by various stationary elements with which the forming fabric is in moving contact. The web is then transferred to the press section where a major proportion of the remaining water is removed by mechanical pressing in a series of high pressure nips between opposed press rolls. Press fabrics are used both to convey the web, and to receive expelled water. The web then passes to the dryer section, in which it is conveyed on at least one dryer fabric over a series of heated cylinders where the remaining water is removed by evaporation. The resulting paper is then calendered, slit and wound onto reels.

Papermaking fabrics must ideally possess multiple characteristics simultaneously:

(a) they must be resistant to abrasive wear caused by their passage over the various stationary elements in the paper making machine, and by contact with solids in the stock which they are to convey;

(b) they must be structurally stable, so as to function as designed within the range of stresses imposed during their use;

(c) they must resist dimensional changes in the plane of the fabric due to moisture absorption over a wide range of moisture contents;

(d) they must resist stretching under the tension imposed by the powered rolls which drive the fabrics on the machine;

(e) they must be resistant to degradation caused by the various materials present in both the fiber-water slurry and in the materials used to clean the fabrics, at the prevailing temperatures of use.

In addition, some industrial fabrics, such as press felts used in the press section of a papermaking machine, must be resistant to compaction and repetitive cyclic compressive stress.

Of the various polymers available for industrial fabrics applications, those most commonly used in paper making are:

polyesters, in particular polyethylene terephthalate (PET) and various copolymers thereof, and polyamides, particularly polyamide-6 (also known as polycaprolactam), and polyamide-6/6 (also known as polyhexamethylene adipamide).

Although yarns and extrusions formed from both polymer types offer certain advantageous characteristics, there are essentially two difficulties associated with their use:

(i) while PET yarn generally has adequate chemical resistance and dimensional stability, and is also amenable to weaving, having good crimpability and heat-setting behaviour, its abrasion and compaction resistance is not always adequate, especially when used in fabrics for higher speed paper machines; and (ii) although yarns of both polyamide-6 and polyamide-6/6 have adequate abrasion and compaction resistance, they do not possess adequate dimensional stability in the moisture range found in the paper making environment, and the mechanical properties of fabrics made from them are known to change.

U.S. Pat. No. 5,137,601 to Hsu discloses papermaking fabrics, in particular press felts, whose component fibers and filaments are fabricated from polypropylene terephthalate, herein after referred to as PPT. In view of the use of "propylene" in the polymer name, this appears to be a polymer of terephthalic acid and 1,2-propanediol. The fabrics are alleged to have chemical resistance properties similar to polyester, and physical properties comparable to polyamide-6. There is no disclosure of suitable intrinsic viscosities for the PPT, no identification of suitable grades, no discussion of the possibility of blending PPT with a second polymer, nor are there any teachings to suggest that this polymer may be suitable to withstand repetitive cyclic compressive stress.

Best, in EP 844320, discloses monofilaments for use in paper making machine clothing whose principle component is polytrimethylene terephthalate (described by Best as PTMT, and stated to be a polymer of terephthalic acid and 1,3-propanediol). In a preferred embodiment, the PTT may be blended with up to 45% by weight of polyurethane so as to improve the abrasion resistance of the monofilaments. Best in EP 0 965 665 also discloses monofilaments of the same polyester with up to about 50% of a polyamide. There is no disclosure in either of these applications of the appropriate grade or intrinsic viscosity of a suitable PTT, nor does the disclosure teach that blending of PTT with any polymer other than either polyurethane or polyamide will improve the ability of the components to withstand repetitive cyclic compressive stresses and therefore increase the service life of the components. Specifically, there is no disclosure or suggestion that any other polymers than polyurethane or polyamide may provide satisfactory results.

Despite these innovations, and for various other reasons including the cost of the raw materials, neat polyamide yarns are still preferred for many industrial fabric applications. The term "neat" as used herein refers to a polymer system containing only one polymer, e.g. polyamide-6, and nothing else, other than conventional additives such as stabilizers, plastic processing aids, colourants, and inhibitors of oxidative, hydrolytic or thermal degradation. The compaction and abrasion resistance of these polyamide based yarns is useful in physically demanding applications, such as paper makers press felts, filtration fabrics, and the like. However, the fact that these polyamide yarns absorb moisture, and thus undergo physical changes in their mechanical properties, dimensions and weight when the environment of use exposes them to different moisture conditions, limits their use in moist environments where such variations often cannot be tolerated. This difficulty is discussed inter alia in U.S. Pat. No. 4,529,013, U.S. Pat. No. 4,289,173 and DE 2,502,466 which teach that fabrics including more than 50% polyamide yarns tend to grow or stretch as they absorb moisture in a wet environment, and will shrink as they dry out, thus rendering the fabric unstable on the machine.

To circumvent these dimensional stability problems, fabric manufacturers have turned to substantially more costly polyamides, such as polyamide-6/10 and polyamide-6/12, especially in instances where wet-to-dry dimensional stability is crucial. However, the cost of these polymer resins is approximately three times greater than either polyamide-6 or polyamide-6/6. Further, polyamide-6/10 and polyamide-6/12 yarns have comparatively poorer thermal properties, making them attractive for only a limited number of very specific applications.

While the moisture stability performance of polyamide-6 and polyamide-6/6 yarns has been improved, yarn manufacturers have as yet been unable to address effectively the special combination of requirements necessary for paper machine clothing applications, in particular: cost, wet-to-dry dimensional stability, and resistance to both abrasive wear and repetitive compressive stress cycling.

Polytrimethylene terephthalate, herein referred to as PTT, which is also known as poly(1,3-propanediol terephthalate), is a polymer that has recently become commercially available. PTT appears to combine a number of the mechanical properties of both polyesters and polyamides. PTT is commercially available from Shell Chemical Co. of Houston, Tex. under the trade name CORTERRA™ and is stated to be the reaction product of purified terephthalic acid and 1,3-propanediol. Two grades of PTT are currently available in bulk: carpet grade, which has an intrinsic viscosity as supplied of about 0.92 dL/g, and a second grade which has an intrinsic viscosity as supplied of about 1.3 dL/g. In both cases, the intrinsic viscosity quoted is measured according to ASTM D4603-96 on the bulk resin prior to extrusion into monofilaments; the intrinsic viscosity when measured on monofilaments of extruded PTT is somewhat lower. Unless indicated otherwise, all intrinsic viscosity values quoted herein are determined by this procedure. ASTM D4603-96 requires that the intrinsic viscosity be measured on a solution in a solvent consisting of 60% by weight phenol and 40% by weight 1,1,2,2-tetrachlorethane at a concentration of between 0.2475 g and 0.2525 g per 50 ml and at a temperature of from 29.99° C. to 30.01° C.

The present inventors have discovered that industrial fabrics whose components are comprised of at least 80% to about 95% by weight of PTT, and from about 20% to about 5% by weight, based on the total weight of the composition, of an elastomeric polyester, are as resistant to compaction, and are able to withstand cyclic repetitive stresses as well as components fabricated from polyamide-6/10 or polyamide-6/12 while retaining their dimensional stability. The components are found to be as chemically stable as those formed from PET and are amenable to weaving when formed into monofilament or multifilament yarns. The finished PTT blend components are thus particularly suitable for use in the assembly of industrial fabrics such as press felts for papermaking machines. Components fabricated from neat PTT having an intrinsic viscosity of about 0.90 dL/g or less cannot survive exposure to about 9,000 cycles of repetitive cyclic compressive stress (under the test conditions set out below) without catastrophic failure. We have now discovered that if at least about 5% by weight of an elastomeric polyester is added to the PTT, then components formed from the resulting blend exhibit sufficient resiliency to survive exposure to at least 54,000 cycles of compressive stress. The resistance to repetitive cyclic compressive stress exhibited by components formed from a blend of PTT having an intrinsic viscosity of at least about 0.90 dL/g, and from about 5% up to about 20% of an elastomeric polyester, is at least equal to that of similar components formed from neat PTT resin having an intrinsic viscosity of about 1.3 dL/g. Components fabricated from a blend of from about 95% to about 80% by weight PTT (having an intrinsic viscosity before processing of from about 0.90 to at least 1.3 dL/g), and from about 20% to about 5% by weight based on the total composition of an elastomeric polyester appear to exhibit resistance to repetitive cyclic compressive stress that is roughly equivalent to that obtained from components formed from neat polyamide-6, polyamide 6/6 or polyamide-6/12. Thus components formed from blends of an elastomeric polyester with PTT having a bulk intrinsic viscosity in the range of from about 0.90 dL/g to at least 1.3 dL/g appear to be suitable for use in industrial fabrics intended for environments where resistance to repetitive cyclic compressive stress, abrasive wear, chemical degradation and dimensional stability under changing moisture conditions are important.

SUMMARY OF THE INVENTION

Figure 1:
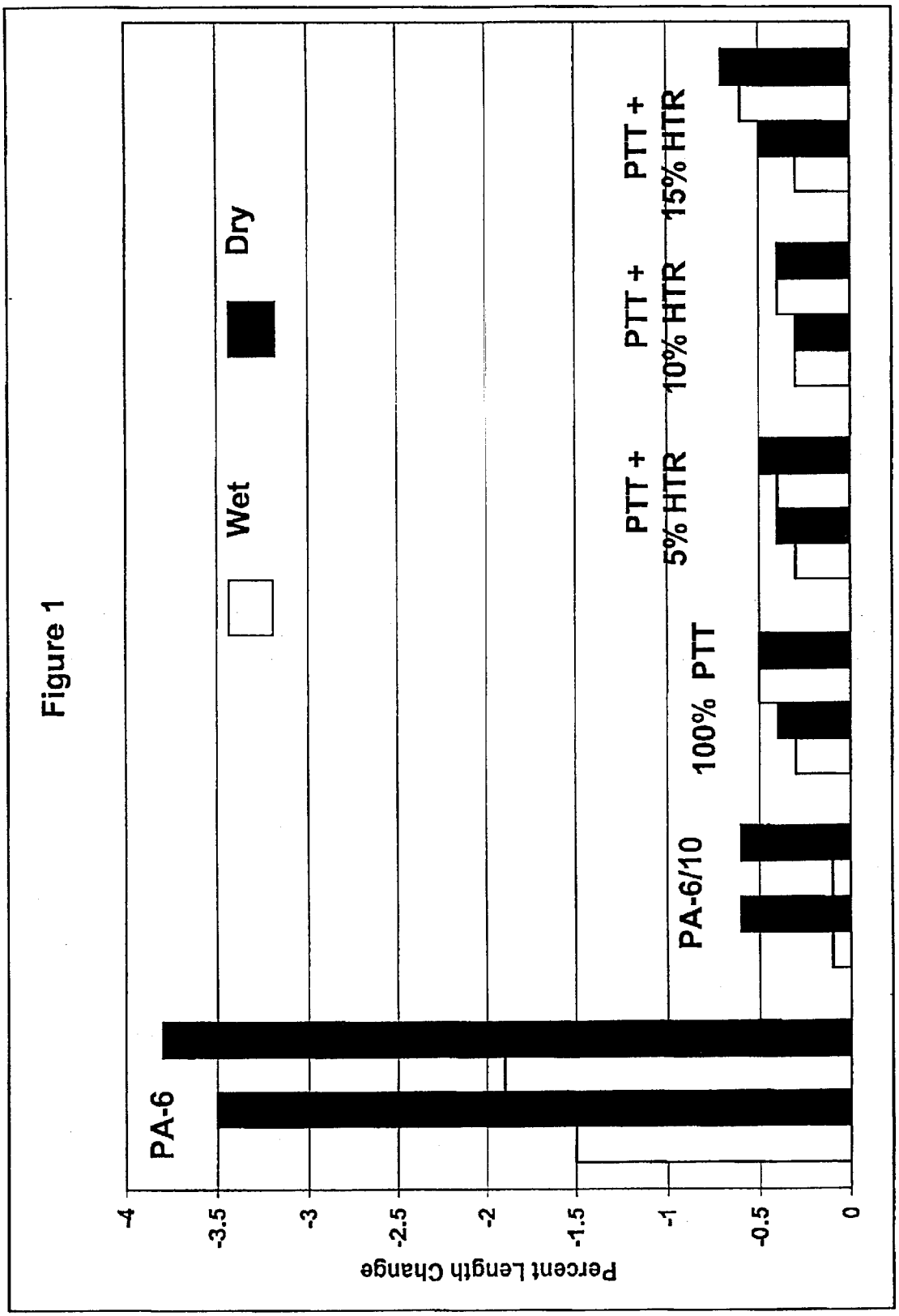
FIG. 1 shows diagrammatically the wet-to-dry dimensional stability of monofilaments prepared from neat polyamides and from a PTT/elastomeric polyester blend.

In its broadest embodiment this invention seeks to provide a thermoplastic polymer blend consisting essentially of from about 95% to about 80% by weight, based on the total composition, of polytrimethylene terephthalate (PTT), having an intrinsic viscosity from about 0.90 dL/g to at least about 1.3 dL/g, and from about 5% to about 20% by weight of an elastomeric polyester.

In a first more narrow embodiment the present invention seeks to provide components which can be assembled into an industrial fabric which are fabricated from a thermoplastic polymer blend consisting essentially of from about 95% to about 80% by weight, based on the total composition, of polytrimethylene terephthalate (PTT), having an intrinsic viscosity from about 0.90 dL/g to at least about 1.3 dL/g, and from about 5% to about 20% by weight of an elastomeric polyester.

In a second narrow embodiment the present invention seeks to provide industrial fabrics including components fabricated from a polymer blend consisting essentially of from about 95% to about 50% by weight, based on the total composition, of polytrimethylene terephthalate (PTT), having an intrinsic viscosity from about 0.90 dL/g to at least about 1.3 dL/g, and from about 5% to about 20% by weight of an elastomeric polyester.

Components such as yarn (monofilament, multifilament and spun) and extrusions formed from this polymer blend can be assembled either alone, or in admixture with components fabricated from other materials, to provide fabrics which are resistant to cyclic repetitive compressive stress and fibrillation, as well as to permanent deformation caused by compressive stress.

The polymer blend may also contain from about 0.05% to about 5% by weight based on the total weight of the composition of one or more conventional additives, such as stabilizers, plastic processing aids, colourants, and inhibitors of oxidative, hydrolytic or thermal degradation. The amount and type of additive used in the blend will be dependent upon the intended end use of the polymer blend.

Preferably, the components of the industrial fabrics of this invention are monofilaments or multifilaments which are assembled by weaving. Alternatively, the components are extruded strips or panels which are assembled by snap/press fitting, spiral winding or by rapier insertion according to the methods described by Baker in EP 802280.

Preferably, all of the components of the industrial fabrics of this invention are fabricated from the PTT blend. Alternatively, at least some of those components that are oriented in the direction of a tensional load placed on the fabric under its conditions of use are fabricated from the PTT blend. As a further alternative, at least some of those components that are oriented in a direction within the plane of the fabric substantially perpendicular to the direction of a tensional load placed on the fabric under its conditions of use are fabricated the PTT blend.

DETAILED DESCRIPTION OF THE INVENTION

Components of the industrial fabrics of this invention are produced using known methods of melt extrusion from the blend of PTT polymeric resin having an intrinsic viscosity of at least about 0.90 dL/g together with a thermoplastic elastomeric polyester, using either a conventional single or twin screw extruder under conditions suitable for the polymer blend involved. From about 95% to about 80% by weight based on the total composition of the PTT resin, together from about 5% to about 20% by weight of the elastomeric polyester, and from about 0.5% to about 5% by weight of any additives (so as to produce a blend whose components total 100% by weight), are metered to the extruder either as separate streams or as a mixture. The polymer resins and any additives are mixed and melted in the extruder at a temperature of from about 230° C. to about 310° C. As the extruder screw(s) conveys the components forward, the molten and thoroughly blended resin is fed into a metering pump that drives the blended resin mixture through a die to form a molten extrudate. The extrusion temperature is preferably from about 230° C. to about 310° C., and more preferably is from about 240° C. to about 280° C.

The molten extrudate can be quenched in air or water; water quenching is preferred. For the production of monofilaments, the solid extrudate is drawn into yarn at room or an elevated temperature in a multi-stage draw process. For the compositions disclosed herein, the preferred range for the drawing temperature is from about 65° C. to about 260° C., with energy being supplied between independently speed controlled godets that provide a final draw ratio of from about 3:1 to about 6:1. The final yarns are allowed to relax about 0–25% by passing them through a relaxing stage at a temperature of from about 65° C. to about 260° C.; the yarns are then wound onto spools. The present inventors have found that the preceding normal processing conditions provide acceptable results; others may prove suitable.

PTT yarns produced from neat PTT resin whose intrinsic viscosity is less than about 0.90 dL/g, known as carpet grade, do not offer the necessary mechanical integrity required for repetitive compressive stress applications. Although the wet-to-dry dimensional stability of yarns formed from this range of intrinsic viscosities is excellent, as well as their mechanical properties as measured by traditional test methods (e.g. percent elongation) compared to a neat polyamide-6 yarn, the performance of these neat PTT yarns under repetitive cyclic compressive stress is poor.

This is demonstrated in the following tests, where the resistance of yarns formed from neat polyamide-6 to repetitive compressive stress is compared to the following:

(a) yarn extruded from neat polyamide-6/6;

(b) yarn extruded from neat PTT resin having an intrinsic viscosity of 0.92 dL/g;

(c) yarn extruded from neat PTT resin having an intrinsic viscosity of 1.3 dL/g;

(d) yarn extruded from a blend of PTT having an intrinsic viscosity of about 0.92 dL/g with an elastomeric polyester; and (e) yarn extruded from a blend of PTT having an intrinsic viscosity of about 1.3 dL/g and an elastomeric polyester.

In these and later tests, the control yarns of neat polyamide-6 resin were extruded from Ultamid® X-301 available from BASF, and the yarns of neat polyamide-6/6 were extruded from DuPont FE 3071, available from E. I. Du Pont of Wilmington, Del. Two grades of PTT were used in these tests; these are Corterra™ CP509200 which as supplied has an intrinsic viscosity of about 0.92 dL/g, and Corterra™ CP51300, which as supplied has an intrinsic viscosity of 1.3 dL/g. The Corterra™ used in the Examples is available from Shell Chemical Company of Houston, Tex.

In these tests, yarns were produced from PTT blended with elastomeric polyester in amounts of from about 5% to about 15% by weight, based on the total composition. The elastomeric polyester used in the blends was polybutylene terephthalate-co-(multibutyleneoxy) terephthalate, which is available under the name Hytrel® 4056 from the Du Pont Chemical Company of Wilmington, Del.

The monofilaments were produced as follows. Each of the polyamide-6, polyamide-6/6, neat PTT samples and PTT/Hytrel blend, were fed through a single screw extruder at a melt temperature of about 280° C. Oriented strands were produced from the extrudate using conventional godet and hot air oven technology to achieve the necessary drawing. The oven temperatures were about 200° C. and overall draw ratios of about 4 were used. The final monofilaments had a diameter of about 0.20 mm.

The monofilament samples were first tested to determine their wet-to-dry dimensional stability. The wet-to-dry dimensional stability of a monofilament was determined using the following method. Fiber samples greater than 1 meter in length were obtained from each of the control and test monofilaments. These samples were first conditioned by exposing them to air at 23° C. and 50% relative humidity for 24 hours. Each sample was then cut to a convenient length, typically 1 meter. The samples were then immersed in distilled water at room temperature for 24 hours, removed from the water, blotted surface dry, and their wet length accurately measured. The samples were then again exposed to air at 23° C. and 50% relative humidity for 24 hours, and their dry length then measured. The wet and dry cycle measurements were then repeated. The changes in length are expressed as a percentage, and the average percent change in length over the two wet to dry cycles is taken as being indicative of the stability of the monofilament under these conditions.

FIG. 1 shows that the percent change in the length of the control monofilament made of neat polyamide-6 was about 3.5% and that of the monofilaments made from the PTT blends was about 0.3%. Comparative data is also included in FIG. 1 for monofilaments produced under essentially the same conditions from polyamide-6/10, using 7030 resin available from Rhône Poulenc Filtec AG, of Emmenbrucke, Switzerland; its change in length under the same test conditions was about 0.8%. This test demonstrates that the monofilaments produced from the PTT/Hytrel blends have superior wet-to-dry dimensional stability when compared to monofilaments produced from the three polyamides.

The resistance to repetitive compressive stress cycling of monofilaments formed from neat PTT whose intrinsic viscosity is from about 0.87 to about 0.90 dL/g (the intrinsic viscosity of the PTT in the finished yarn is lower) is poor and their physical response, as determined by their loss in diameter and gross failure by fibrillation, is unacceptable for paper machine clothing applications. This was surprising, as this grade of PTT is supplied as "carpet grade", which was expected to withstand repetitive compressive stress. There was no way to predict a priori that this material would not be suitable in applications where resistance to repeated compressive stress is important, such as clothing for a papermaking machine.

Table 1 provides test data to illustrate this case. In this test, monofilaments formed from the polyamide-6 control resin, polyamide-6/6, and various blends of PTT and Hytrel, were each subjected to a repetitive cyclic compressive stress test to simulate the compressive stress cycling experienced by a paper machine press felt passing through a nip under load. In this test, a pressure of approximately 7.3 MPa at 40° C. was applied at a frequency of 300 compression per minute for 180 minutes using a laboratory scale dynamic compaction tester to simulate 54,000 compression cycles. The samples are each wrapped around a notched crossover plate so as to create a grid which simulates a press felt base weave with a mesh of 16×16 yarns per cm. The samples and crossover plate are then placed in the dynamic compaction tester where they are subjected to repeated compression under constant load and recovered under zero load. The samples are removed at specific time intervals and examined for damage. Table 1 shows the calculated physical response of all of the monofilaments, based on a summary of test samples, as determined by their percent loss in original diameter following 54,000 cycles of compression and relaxation.

In Table 1, PA-6 refers to polyamide-6; PA-6/6 refers to polyamide-6/6; PTT(A) refers to PTT yarns formed from resin having an intrinsic viscosity of 0.92 dL/g as supplied; PTT(B) refers to PTT yarns formed from resin having an intrinsic viscosity of 1.3 dL/g as supplied; and HTR refers to Hytrel 4056; all blends total 100%.

TABLE 1

PERCENT DIAMETER LOSS OF PTT, POLYAMIDE-6 AND POLYAMIDE-6/6 MONOFILAMENTS FOLLOWING REPETITIVE COMPRESSIVE STRESS CYCLES.

| Yarn Composition | Test Temperature (° C.) | Percent Diameter Loss after Number of Compression Cycles. Number of Cycles | | | | |
|---|---|---|---|---|---|---|
| | | 9,000 | 18,000 | 27,000 | 36,000 | 54,000 |
| PA-6 | 40 | 18.6 | 23.2 | 26.0 | 28.2 | 30.4 |
| PA-6/6 | 40 | 15.4 | 21.2 | 24.9 | 27.1 | 29.5 |
| PTT (A) | 40 | Samples failed before 9,000 cycles | | | | |
| 95% PTT (A), 5% HTR | 40 | 21.7 | 29.9 | 35.4 | 37.8 | 43.7 |
| 90% PTT (A),10% HTR | 40 | 24.5 | 33.3 | 39.6 | 42.3 | 46.7 |
| 85% PTT (A),15% HTR | 40 | 22.9 | 28.5 | 34.8 | 40.3 | 44.0 |
| PTT (B) | 40 | 15.4 | 21.9 | 25.2 | 28.5 | 30.9 |
| 95% PTT (B), 5% HTR | 40 | 17.0 | 23.1 | 26.1 | 28.7 | 32.4 |
| 90% PTT (B),10% HTR | 40 | 18.8 | 25.3 | 27.8 | 30.5 | 33.0 |
| 85% PTT (B),15% HTR | 40 | 22.9 | 27.3 | 31.7 | 35.2 | 38.7 |
| PA-6 | 60 | 33.2 | 38.7 | 41.6 | 43.2 | 45.6 |
| PA-6/6 | 60 | 29.1 | 32.2 | 37.0 | 39.6 | 41.1 |
| PTT (A) | 60 | Samples failed before 9,000 cycles | | | | |
| 95% PTT (A), 5% HTR | 60 | 36.3 | 44.8 | 46.6 | 50.5 | 52.9 |
| 90% PTT (A),10% HTR | 60 | 37.3 | 44.3 | 49.7 | 51.6 | 53.9 |
| 85% PTT (A),15% HTR | 60 | 40.4 | 45.8 | 49.1 | 51.0 | 54.1 |
| PTT (B) | 60 | 18.7 | 23.8 | 27.4 | 29.8 | 32.8 |
| 95% PTT (B), 5% HTR | 60 | 21.5 | 26.9 | 30.7 | 32.9 | 38.0 |
| 90% PTT (B),10% HTR | 60 | 25.9 | 30.8 | 36.7 | 37.0 | 40.7 |

TABLE 1-continued

PERCENT DIAMETER LOSS OF PTT, POLYAMIDE-6 AND POLYAMIDE-6/6
MONOFILAMENTS FOLLOWING REPETITIVE COMPRESSIVE STRESS CYCLES.

| Yarn Composition | Test Temperature (° C.) | Percent Diameter Loss after Number of Compression Cycles. Number of Cycles | | | | |
|---|---|---|---|---|---|---|
| | | 9,000 | 18,000 | 27,000 | 36,000 | 54,000 |
| 85% PTT (B),15% HTR | 60 | 27.4 | 33.8 | 39.8 | 42.1 | 47.7 |
| PA-6 | 85 | 29.9 | 33.6 | 36.0 | 37.2 | 39.6 |
| PA-6/6 | 85 | 28.8 | 35.2 | 37.3 | 38.8 | 41.8 |
| PTT (A) | 85 | Samples failed before 9,000 cycles | | | | |
| 95% PTT (A), 5% HTR | 85 | 40.8 | 45 | 46.7 | 50.5 | 53.5 |
| 90% PTT (A),10% HTR | 85 | 42.0 | 47.7 | 51.1 | 52.7 | 55.9 |
| 85% PTT (A),15% HTR | 85 | 42.4 | 48.0 | 50.3 | 51.5 | 54.3 |
| PTT (B) | 85 | 21.0 | 32.6 | 36.0 | 37.8 | 41.7 |
| 95% PTT (B), 5% HTR | 85 | 31.6 | 37.5 | 45.5 | 47.6 | 50.5 |
| 90% PTT (B),10% HTR | 85 | 37.0 | 43.9 | 46.5 | 48.8 | 51.2 |
| 85% PTT (B),15% HTR | 85 | 38.9 | 44.0 | 47.1 | 49.0 | 52.4 |

Table 1 shows that yarns fabricated from PTT(A), which has an intrinsic viscosity of about 0.92 dL/g as supplied, do not survive the repetitive cyclic compressive stress test. However, following addition of from 5% to about 15% Hytrel elastomeric polyester to PTT(A), the yarns are now able to survive the test and suffer a diameter loss that is comparable to that found for the neat polyamide-6 and polyamide-6/6 control yarns. This is a surprising result. Further, Table 1 shows that for yarns fabricated from PTT (B), which has an intrinsic viscosity of about 1.3 dL/g as supplied, either alone or blended with from about 5% to about 15% Hytrel elastomeric polyester, the percent loss in diameter under the same conditions is less than that of the neat polyamide-6 and polyamide-6/6 control yarns.

It can also be seen that temperature does affect the ability of both the PTT and polyamide-6 filaments to resist compaction; the PTT filaments according to this invention show a lower percentage loss at all three test temperatures.

The results in Table 1 also show that a yarn formed from neat PTT having an intrinsic viscosity of from about 0.87 to about 0.92 dL/g may not be viable in applications where resistance to repeated compressive stress is important, such as in papermaking machine press felt fabrics.

Table 2 provides data with respect to 4 experimental press felts, each having two layers of 125 gsm batt needled to the machine side of the woven base fabric, and 4 layers of 125 gsm batt needled to the paper side of the same woven base fabrics. The base fabrics are woven using the following yarn types.

Cross Machine Direction (CD) Warp Monofilament:
  (a) "Blend PTT":92.5% by weight of 0.92 dL/g PTT blended with 7.5% by weight Hytrel 4056, an elastomeric polyester;
  (b) "PTT(B)": polytrimethylene terephthalate having an intrinsic viscosity prior to extrusion of 1.3 dL/g; or
  (c) "PA-6/10": polyamide-6/10 as control.

Machine Direction (MD) Weft Monofilament:
  (a) "PTT(B)" as used in the warp monofilaments;
  (b) "Blend PTT" as used in the warp monofilaments; or
  (c) "PA-6": polyamide-6 as control.

The data in Table 2 shows that press felts fabrics including Blend PTT yarns located in the machine direction have a higher elastic modulus when wet than fabrics which include yarns formed from polyamide-6 oriented in the same direction, and that the change in elastic modulus from dry to wet is much smaller for the press felt fabrics including the Blend PTT yarns when compared to similar fabrics including monofilaments formed from polyamide-6 oriented in the same direction. The results in Table 2 show that the elastic modulus of the fabrics containing the Blend PTT monofilaments is nearly equal to that of fabrics containing unblended, higher intrinsic viscosity PTT(B).

TABLE 2

Comparison of the Elastic Moduli of Experimental Fabrics Containing One of PTT Blend, High Intrinsic Viscosity PTT or Polyamide 6 Monofilaments in the Machine Direction

| Fabric Conditions | CD (warp) Monofilament Polymer | MD (weft) Monofilament Polymer | Elastic Modulus Dry Fabric (pli) | Elastic Modulus Wet Fabric (pli) | Percent Change |
|---|---|---|---|---|---|
| Not heatset | Blend PTT | PA-6 | 1370 | 770 | −43.8 |
| Not Heatset | Blend PTT | PTT (B) | 1785 | 1640 | −8.1 |
| Not Heatset | Blend PTT | Blend PTT | 1755 | 1695 | −3.4 |
| Not Heatset | PA-6/10 | PTT (B) | 2270 | 1755 | −22.7 |
| Not Heatset | PA-6/10 | PA-6 | 1725 | 780 | −54.8 |
| Not Heatset | PA-6/10 | Blend PTT | 2220 | 1695 | −23.6 |
| Not Heatset | PTT (B) | Blend PTT | 1665 | 1755 | 5.4 |
| Heatset | Blend PTT | PA-6 | 1640 | 935 | −43.0 |
| Heatset | Blend PTT | PTT (B) | 2325 | 2325 | 0 |
| Heatset | Blend PTT | Blend PTT | 2630 | 2500 | −4.9 |
| Heatset | PA-6/10 | PTT (B) | 2440 | 2440 | 0 |
| Heatset | PA-6/10 | PA-6 | 1725 | 890 | −48.4 |
| Heatset | PA-6/10 | Blend PTT | 2565 | 2440 | −4.9 |
| Heatset | PTT (B) | Blend PTT | 2630 | 2440 | −7.2 |
| Batt Needled | Blend PTT | PA-6 | 4350 | 1460 | −66.4 |
| Batt Needled | Blend PTT | PTT (B) | 3570 | 3185 | −11.0 |
| Batt Needled | Blend PTT | Blend PTT | 3520 | 3450 | −2.0 |
| Batt Needled | PA-6/10 | PTT (B) | 3625 | 3225 | −11.0 |
| Batt Needled | PA-6/10 | PA-6 | 4425 | 1435 | −67.6 |
| Batt Needled | PA-6/10 | Blend PTT | 3760 | 3400 | −10.0 |
| Batt Needled | PTT (B) | Blend PTT | 3625 | 3245 | −10.0 |
| 2-Roll Press | Blend PTT | PA-6 | 3125 | 1315 | −57.9 |
| 2-Roll Press | Blend PTT | PTT (B) | 3400 | 3030 | −10.9 |
| 2-Roll Press | Blend PTT | Blend PTT | 3185 | 3030 | −4.9 |
| 2-Roll Press | PA-6/10 | PTT (B) | 3290 | 2775 | −15.7 |
| 2-Roll Press | PA-6/10 | PA-6 | 2940 | 1265 | −57.0 |
| 2-Roll Press | PA-6/10 | Blend PTT | 3330 | 2825 | −15.2 |
| 2-Roll Press | PTT (B) | Blend PTT | 3125 | 3125 | 0 |

In Table 2, the terms used have the following meanings:
  "Not Heatset" refers to the woven base fabric;
  "Heatset" refers to the woven base fabric after normal first heatsetting;

"Batt Needled" refers to the press felt fabric after first heatsetting, needling of paper and machine side layer batts, and second heatsetting;

"2-Roll Press" refers to the batt needled press felt fabric following 40,000 cycles through an experimental two roll press through which the fabric is passed under a constant load of 150 pli (pounds per linear inch);

"PA-6/10" refers to monofilament formed from polyamide 6/10 which was obtained from the Shakespeare Company of Columbia, S.C. under yarn designation NX150;

"PA-6" refers to monofilaments formed from polyamide-6 resin and which were obtained from Johnson Filaments of Williston, Vt. under yarn designation N978.

All fabrics above were "endless woven" according to the same known double layer 8-shed/4-repeat weave pattern wherein the MD weft yarn passes over 1 PS warp, between a pair of stacked PS/MS yarns, beneath 1 MS warp, between a pair of stacked PS/MS yarns, and then over 1 PS warp to repeat the pattern.

The diameter of all of the CD warp yarns was 0.4 mm. The MD weft yarns in all samples were 0.2/2/3 cabled monofilaments.

Two layers of 125 gsm polyamide-6 fiber batt were needled to the machine side of all of the fabric samples and 4 layers of the same batt were needled to the paper side of all of the fabric samples. All fabric samples were needled according to the same schedule with 12 passes through the needling machine at 400 penetrations/min. at a penetration depth of 12–14 mm.

All of the woven base fabrics were exposed to standard heatsetting conditions and temperature of 150° C. so as to stabilize them prior to needling. The paper and machine side layer batts were then needled to the base and the resulting press felt fabric exposed to 4 passes through a second heatsetting step at 100° C., 130° C., 140° C. and 180° C. respectively.

The elastic modulus test results in Table 2, and the tensile strength results shown in Table 3, below, of the samples were determined according to the following procedure. A fabric sample measuring at least 1 inch in the weft, machine, direction by at least 1.5 inches in the warp, cross machine, direction is taken from the fabric. The cross machine direction yarns are stripped out alternately from either edge to provide a band about 1 inch wide, which contains only machine direction yarns. Each of the two bands is clamped into a constant rate of extension tensile testing apparatus equipped with a 1,200 lb. minimum capacity load cell having data outputs to a chart recorder (or other suitable data acquisition device). The fabric sample is then subjected to an increasing machine direction tensile load, and changes in sample length are measured. The resulting data is converted into a stress-strain curve; the elastic modulus is then defined as the slope of the linear region of the stress-strain curve, located between an initial non-linear portion, and the fabric yield point, also known as the fabric elastic limit. The tensile strength is determined by continuing to stretch the fabric sample beyond the fabric yield point until it fails. The force required to do this is recorded, and converted to the related pli value.

In the test results, the elastic modulus of both dry and wet fabrics are shown. In the test, a "dry" fabric is one that has not been immersed in water, and a "wet" fabric is one that has been soaked in room temperature water for at least 20 hours, and tested when wet.

From the data, it is apparent that the elastic modulus of the wet fabrics containing Blend PTT yarns in the machine direction is much greater than that of fabrics containing PA-6 yarns in the same direction. Also, the percent difference in the elastic modulus between the dry fabric and the wet fabric is much smaller for the fabrics having Blend PTT yarns in the machine direction than those woven with PA-6 yarns in the same direction, and is comparable to fabrics containing PTT(B) yarns in the same direction.

The elastic modulus of a pres felt fabric is important in that it is a measure of the ability of the fabric to resist stretch and remain dimensionally stable while in use on the paper making machine. The test results in Table 2 demonstrate that the elastic modulus of press fabrics whose woven base structure consists of Blend PTT yarns in at least the machine direction is higher, and more predictable, than fabrics containing polyamide-6/10 yarns in the same direction, and is comparable to the elastic modulus of fabrics containing PTT(B) yarns in the same direction.

The dimensional stability of yarns used in the manufacture of papermakers' press felts is also important. When a new press felt is installed in the press section of a paper making machine, the fabric is usually first "broken in" by saturating it with water and running it under normal tensional loads before beginning to make paper. It is well known in the industry that a press felt containing polyamide-6 yarns oriented in the machine direction will tend to stretch as it is tensioned and becomes saturated with water. The elastic modulus of the fabric will provide an indication of the amount of stretch the fabric can be expected to experience under running conditions. The elastic modulus of fabrics containing Blend PTT yarns in the machine direction will not change to the same extent as the elastic modulus of fabrics containing polyamide-6 yarns; press felts including Blend PTT yarns in the machine direction yarns are more dimensionally stable under wet-to-dry conditions than fabrics containing polyamide-6 yarns.

Wet-to-dry dimensional stability in the cross machine direction is also important because press felts whose base fabrics include Blend PTT yarns in the cross machine direction will tend to resist widening under the compaction of the press rolls. Press felts whose base fabrics include polyamide-6 yarns in the cross machine direction will tend, in some instances, to spread out beyond the width of the press roll due to their swelling as the component yarns absorb water, which is undesirable, while those containing Blend PTT yarns generally will not. The elastic modulus test results reported in Table 2 show that press felt base fabrics into which include Blend PTT yarns will be more resistant to stretch when wet, and will be more dimensionally stable under wet-to-dry conditions, than fabrics woven from polyamide-6/10 yarns oriented in the same direction. The tests show that the elastic modulus of either wet or dry Blend PTT fabrics will be at least comparable to, and in most instances will be better than, that of fabrics containing polyamide-6 yarns. Thus, monofilament yarns formed from the polymer blends of this invention will be suitable for use in press felts intended for use in papermaking machines, especially in situations where dimensional stability and resistance to compressive stress are important.

The tensile strength of a fabric intended for use as a press felt is also an important property when considering the suitability of a polymer material for use in the component yarns. To assess the viability of the yarns formed from the polymer blend of the present invention when used in a papermaker's press felt, the tensile strengths of the fabrics listed in Table 2 are shown in Table 3. Tensile strength, as used herein, is a measure of the maximum stress to which a fabric can be exposed before failure. Fabrics intended for use as press felts require a tensile of strength of at least about 240 pli.

TABLE 3

Comparison of Tensile Strengths of Experimental Fabrics

| Fabric Conditions | CD (warp) Monofilament Polymer | MD (weft) Monofilament Polymer | Tensile Strength Dry Fabric (pli) | Tensile Strength Wet Fabric (pli) | Percent Change |
|---|---|---|---|---|---|
| Not Heatset | PA-6/10 | PTT (B) | 450 | 340 | −24.4 |
| Not Heatset | Blend PTT | PTT (B) | 340 | 310 | −8.8 |
| Not Heatset | Blend PTT | Blend PTT | 320 | 300 | −6.3 |
| Not Heatset | PA-6/10 | PA-6 | 380 | 290 | −23.7 |
| Not Heatset | Blend PTT | PA-6 | 460 | 280 | −39.1 |
| Not Heatset | PTT (B) | Blend PTT | 290 | 280 | −3.4 |
| Not Heatset | PA-6/10 | Blend PTT | 350 | 270 | −22.9 |
| Heatset | PA-6/10 | PTT (B) | 380 | 350 | −7.9 |
| Heatset | PTT (B) | Blend PTT | 370 | 350 | −5.4 |
| Heatset | Blend PTT | PTT (B) | 370 | 340 | −8.1 |
| Heatset | Blend PTT | PA-6 | 515 | 330 | −35.9 |
| Heatset | Blend PTT | Blend PTT | 380 | 330 | −13.2 |
| Heatset | PA-6/10 | PA-6 | 490 | 330 | −32.7 |
| Heatset | PA-6/10 | Blend PTT | 370 | 330 | −10.8 |
| Batt Needled | PA-6/10 | PA-6 | 710 | 570 | −19.7 |
| Batt Needled | Blend PTT | PA-6 | 635 | 560 | −11.8 |
| Batt Needled | Blend PTT | PTT (B) | 490 | 470 | −4.1 |
| Batt Needled | PA-6/10 | PTT (B) | 470 | 445 | −5.3 |
| Batt Needled | Blend PTT | Blend PTT | 420 | 390 | −7.1 |
| Batt Needled | PA-6/10 | Blend PTT | 425 | 380 | −10.6 |
| Batt Needled | PTT (B) | Blend PTT | 420 | 380 | −9.5 |
| 2-Roll Press | PA-6/10 | PA-6 | 625 | 570 | −8.8 |
| 2-Roll Press | Blend PTT | PA-6 | 635 | 560 | −11.8 |
| 2-Roll Press | Blend PTT | Blend PTT | 310 | 300 | −3.2 |
| 2-Roll Press | PTT (B) | Blend PTT | 330 | 290 | −12.1 |
| 2-Roll Press | PA-6/10 | Blend PTT | 315 | 250 | −20.6 |
| 2-Roll Press | Blend PTT | PTT (B) | 275 | 240 | −12.7 |
| 2-Roll Press | PA-6/10 | PTT (B) | 240 | 200 | −16.7 |

The sundry terms used in Table 3 have the same meanings as those given above for these terms for Table 2.

The data in Table 3 shows that, although the tensile strength of fabrics containing Blend PTT yarns in the machine direction is less than that of fabrics containing pa-6 in the same direction, it is still adequate for paper making machine clothing.

What is claimed is:

1. A thermoplastic polymer blend consisting essentially of from about 95% to about 80% by weight, based on the total composition, of polytrimethylene terephthalate, having an intrinsic viscosity from about 0.90 dL/g to at least about 1.3 dL/g, and from about 5% to about 20% by weight of an elastomeric polyester, the intrinsic viscosity of the PTT being measured according to ASTM D4603-96.

2. A thermoplastic polymer blend according to claim 1 further including from about 0.05% to about 5% by weight based on the total weight of the composition of one or more conventional additives.

3. A thermoplastic polymer blend according to claim 2 wherein the additives comprise at least one member chosen from the group consisting of stabilizers, plastic processing aids, colourants, and inhibitors of oxidative, hydrolytic or thermal degradation.

4. A thermoplastic polymer blend consisting essentially of from about 95% to about 80% by weight, based on the total composition, of polytrimethylene terephthalate, having an intrinsic viscosity from about 0.90 dL/g t at least about 1.3 dL/g, and from about 5% to about 20% by weight of an elastomeric polyester, the intrinsic viscosity of the PTT being measured on a solution in a solvent consisting of 60% by weight phenol and 40% by weight 1,1,2,2-tetrachlorethane at a concentration of between 0.2475 g and 0.2525 g per 50 ml and at a temperature of from 29.99° C. to 30.01° C., according to ASTM D4603-96.

5. A thermoplastic polymer blend according to claim 4 further including from about 0.05% to about 5% by weight based on the total weight of the composition of one or more conventional additives.

6. A thermoplastic polymer blend according to claim 5 wherein the additives comprise at least one member chosen from the group consisting of stabilizers, plastic processing aids, colourants, and inhibitors of oxidative, hydrolytic or thermal degradation.

* * * * *

UNITED STATES PATENT AND TRADEMARK OFFICE
CERTIFICATE OF CORRECTION

PATENT NO. : 6,462,145 B1
DATED : October 8, 2002
INVENTOR(S) : Fleri and Baker

It is certified that error appears in the above-identified patent and that said Letters Patent is hereby corrected as shown below:

<u>Title page,</u>
Item [54], the title of the invention should appear as -- POLYMER BLENDS OF TRIMETHYLENE TEREPHTHALATE AND ELASTOMERIC POLYESTER --

Signed and Sealed this

First Day of April, 2003

JAMES E. ROGAN
*Director of the United States Patent and Trademark Office*